United States Patent [19]

Kosaka et al.

[11] 4,059,076
[45] Nov. 22, 1977

[54] METHOD AND APPARATUS FOR GENERATING REFORMED GAS CONTAINING HYDROGEN AND CARBON MONOXIDE FROM HYDROCARBON FUEL

[75] Inventors: Katuaki Kosaka, Hidaka; Zene Ueno, Tokyo, both of Japan

[73] Assignee: Nissan Motor Co., Ltd., Yokohama, Japan

[21] Appl. No.: 676,479

[22] Filed: Apr. 13, 1976

[30] Foreign Application Priority Data

Apr. 21, 1975 Japan ................... 50-48323

[51] Int. Cl.² .............. F02B 43/08; F02B 75/20; C10J 3/00
[52] U.S. Cl. ........................... 123/3; 48/93; 48/102 A; 48/DIG. 8; 123/59 EC; 123/73 C
[58] Field of Search ..... 123/1 A, 3, 59 EC, DIG. 12, 123/73 A, 73 C; 48/93, 102 A, DIG. 8

[56] References Cited

U.S. PATENT DOCUMENTS

| | | | |
|---|---|---|---|
| 1,210,897 | 2/1917 | Browne | 123/73 C |
| 1,715,775 | 6/1929 | Newitt et al. | 48/93 |
| 2,846,297 | 8/1958 | Herwig | 48/DIG. 8 |
| 3,779,221 | 12/1973 | Gartner | 123/119 B |
| 3,908,606 | 9/1975 | Toyoda et al. | 123/3 |
| 3,963,000 | 6/1976 | Kosaka et al. | 123/3 |
| 4,002,151 | 1/1977 | Toyoda et al. | 123/3 |
| 4,004,554 | 1/1977 | Kosaka et al. | 123/DIG. 12 |

Primary Examiner—Ronald H. Lazarus
Assistant Examiner—Craig R. Feinberg
Attorney, Agent, or Firm—Lowe, King, Price & Markva

[57] ABSTRACT

A hydrocarbon fuel is subjected to combustion in an internal combustion engine by the use of excess air, and the exhaust gas is utilized as heat and oxygen sources for partial oxidation of the hydrocarbon fuel in a separate reformer. A resulting mixture of the reformed gas and the exhaust gas is subjected to heat exchange with air to be drawn into the engine and/or the fuel to be supplied to the reformer and thereafter is supplied to a larger internal combustion engine.

12 Claims, 4 Drawing Figures

METHOD AND APPARATUS FOR GENERATING REFORMED GAS CONTAINING HYDROGEN AND CARBON MONOXIDE FROM HYDROCARBON FUEL

This invention relates to a method and apparatus for converting a hydrocarbon fuel into a reformed gas which contains as combustible components essentially hydrogen and carbon monoxide and serves as an advantageous fuel for an internal combustion engine.

It is known that internal combustion engines typified by a reciprocating engine can be operated with extremely reduced concentrations of pollutants in the exhaust gas and at an improved thermal efficiency or mileage if a usually employed hydrocarbon fuel is preliminarily converted into a gaseous mixture or reformed gas which contains large amounts of hydrogen and carbon monoxide and then fed to the engine together with air.

Either liquid hydrocarbon fuels exemplified by gasoline, kerosene, light oil and even alcohols or gaseous fuels such as LPG and natural gas can be converted into a reformed gas by partial oxidation of the fuel at elevated temperatures usually in the presence of a catalyst. Industrial apparatus for the reforming of hydrocarbon fuels, particularly with respect to liquid fuels, have been in practical use as stationary plants. Conventional apparatus, however, are not suitable for use as a component of a fuel system for a vehicle engine such as, for example, an automotive engine because the apparatus include bulky elements such as a compressor and pumps other than a reaction chamber with a burner. Besides, there is need for the provision of heat shield members.

It is an object of the present invention to provide an improved method of converting a hydrocarbon fuel into a reformed gas containing essentially hydrogen and carbon monoxide as combustible components, which method is practicable on motor vehicles.

It is another object of the invention to provide apparatus for converting a hydrocarbon fuel into the above described reformed gas, which apparatus is characterized by simplicity in construction and compactness of its heat-generating part and serves as a fuel system of an automotive internal combustion engine.

According to a method of the invention, a hydrocarbon fuel is subjected to combustion in an internal combustion engine by the use of excess air so that the exhaust gas may contain a relatively large amount of oxygen, and this exhaust gas is mixed with the same hydrocarbon fuel in a predetermined proportion. The resulting mixture is introduced into a reformer to cause partial oxidation reactions of the hydrocarbon fuel and generate a gaseous reformed fuel containing hydrogen and carbon monoxide. The mixing and the reactions are carried out while the exhaust gas has a sufficiently high temperature to initiate and sustain the reactions.

The engine for use in this method is preferably a two-cycle compression-ignition engine. A gaseous product of the reactions, which is a mixture of the reformed fuel and the aforementioned exhaust gas, is preferably subjected to heat exchange with air to be drawn into the engine and/or the fuel to be supplied to the reformer before the reaction product is supplied to a separate and larger internal combustion engine.

The fuel for reforming is mixed with the exhaust gas in such a proportion that the ratio of air contained in the mixed exhaust gas to the fuel is in the range from about 5 to about 8 by weight.

According to the invention, apparatus for carrying out the above described method serves as a principal part of a fuel system of an internal combustion engine typified by an automotive engine and comprises the following elements: (a) an auxiliary internal combustion engine which is of a smaller displacement than the former engine and is preferably a two-cycle compression-ignition engine; (b) fuel supply means for supplying a hydrocarbon fuel to the auxiliary engine at such a rate that the hydrocarbon fuel is subjected to combustion in the auxiliary engine in the presence of excess air; (c) a conventional reformer having therein a reaction chamber adapted to cause the aforementioned reactions and generate the reformed fuel; (d) a first conduit connecting the auxiliary engine to the reformer for supplying the exhaust gas of the auxiliary engine to the reaction chamber while the exhaust gas is at an elevated temperature; (e) fuel supply means for supplying the hydrocarbon fuel to the reformer at a controlled rate; and (f) a second conduit connecting the reformer to the firstly recited engine for passing therethrough a gas which is discharged from the reaction chamber.

The displacement of the auxiliary engine is preferably about ¼ of the displacement of the firstly recited engine. Preferably, the apparatus includes heat exchange means for accomplishing heat exchange between the gas discharged from the reaction chamber and air to be drawn into the auxiliary engine and/or fuel to be supplied to the reformer.

The invention will be fully understood from the following detailed description of preferred embodiments with reference to the accompanying drawings, wherein.

Figure 1:
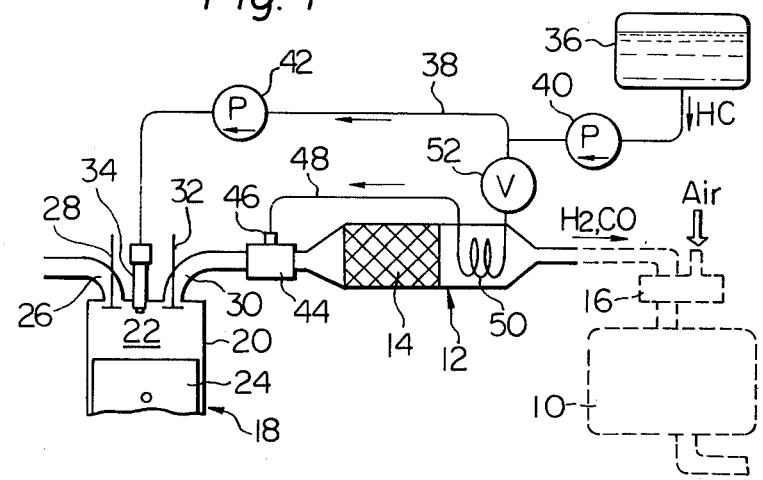
FIG. 1 is a diagrammatic presentation of a fuel reforming apparatus as a preferred embodiment of the invention in combination with an internal combustion engine.

In FIG. 1, a fuel reforming apparatus according to the invention constitutes a principal part of a fuel system for a conventional internal combustion engine 10 which provides motive power, for example, to propel an automobile. The fuel reforming apparatus includes a conventional reformer 12 which forms therein a reaction chamber 14 containing a reforming catalyst such as, for example, a known nickel catalyst. The discharge port of the reformer 12 is connected to a mixing chamber 16 for producing a combustible mixture of the reformed fuel and air to operate the engine 10. As an essential feature of the invention, the fuel reforming apparatus has a conventional combustion engine 18 which is not for the purpose of providing motive power but almost exclusively for supplying heat to the reaction chamber 14 of the reformer 12 in the form of exhaust gas. This engine 18 (which will hereinafter be referred to as the auxiliary engine to distinguish it from the other or main engine 10) is a four-cycle compression-ignition engine in this embodiment and has the following elements in the usual manner: a cylinder block 20 forming therein a combustion chamber 22, a piston 24, an intake port 26 for admission of air with an intake valve 28, an exhaust port 30 with an exhaust valve 32 and a fuel injector 34. A liquid hydrocarbon fuel is supplied to the fuel injector 34 from a fuel tank 36 through a fuel passage 38 which is equipped with a fuel transfer pump 40 and a pressurizing pump 42. The displacement of the auxiliary engine 18 is smaller than, preferably about ¼ of, the displacement dispalcement of the main engine 10. The hydrocarbon fuel is supplied to the auxiliary engine 18 at such a rate that the fuel is subjected to combustion in the auxiliary engine 18 at an air/fuel ratio distinctly above the stoichiometric ratio.

The exhaust port 30 of the auxiliary engine 18 is connected to the reaction chamber 14 of the reformer 12 via a mixing chamber 44. The mixing chamber 44 is equipped with a fuel metering the injecting device 46. A fuel passage 48 connects the fuel tank 36 to the metering and injecting device 46 via a heat exchanger 50 which is assembled with the reformer 12 and located between the reaction chamber 14 and the mixing chamber 16. A flow control valve 52 is arranged to selectively cause and interrupt the flow of the hydrocarbon fuel through the fuel passage 48. The auxiliary engine 18 can be operated at variable speeds depending on the speed and/or load at which the main engine 10 is operated.

At an initial stage of the operation, the valve 52 is kept closed so that the hydrocarbon fuel is supplied only to the auxiliary engine 18. Accordingly the exhaust gas of the auxiliary engine 18 alone is supplied to the reformer 12. Since the exhaust gas is at temperatures usually ranging from about 400° to about 800° C, the catalyst in the reaction chamber 14 is heated in a short time to a temperature at which the intended catalytic reforming of the hydrocarbon fuel is realizable. Then the valve 52 is opened, and the fuel is supplied from the tank 36 to the reaction chamber 14 by means of the metering and injecting device 46. In the present invention, oxygen which is needed for converting the fuel into a reformed gas is supplied to the reaction chamber 14 as a component of the exhaust gas of the auxiliary engine 18 (which is operated with a lean air/fuel mixture as described hereinbefore). The fuel feed rates to the auxiliary engine 18 and the mixing chamber 44 are regulated such that the mixture of the exhaust gas and the hydrocarbon fuel produced in the mixing chamber 44 has an air/fuel ratio by weight in the range from about 5 to about 8.

The hydrocarbon fuel supplied to the mixing chamber 44 is converted into the reformed gas, which is mainly a mixture of hydrogen and carbon monoxide, in the reaction chamber 14. The reformed gas is supplied to the mixing chamber 16 to operate the main engine 10 with a gaseous mixture of the reformed fuel and air. The exhaust gas of the auxiliary engine 18 is fed to the main engine 10 together with the reformed gas, but the quantity of this exhaust gas amounts only to about ¼ of the air/fuel (reformed fuel) mixture fed to the main engine 10. The presence of this exhaust gas in the air/fuel mixture fed to the main engine 10 has no significant influence on the operation of the main engine 10 because of the limited amount of the exhaust gas and an excellent combustibility of the reformed gas.

Figure 2:
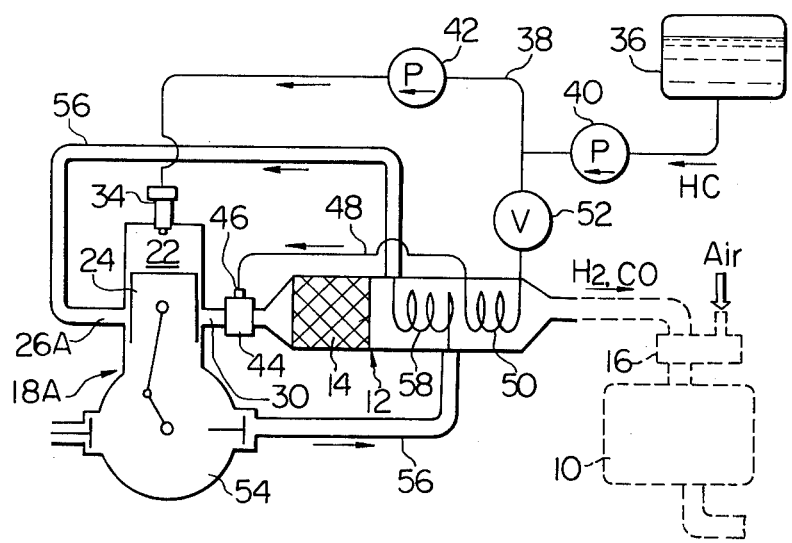
FIGS. 2–4 are respectively three different modifications of the same apparatus also embodying the invention.

In a modified reforming apparatus of FIG. 2, a two-cycle compression-ignition engine 18A is utilized as the auxiliary engine. The auxiliary engine 18A is provided with a conduit 56 to transfer air from the crankcase 54 of the auxiliary engine 18A to an air inlet port 26A of the auxiliary engine 18A through a heat exchanger 58 which is combined with the reformer 12 at a location downstream of the reaction chamber 14. Heating of air flowing in the conduit 56 is favorable to combustion in the auxiliary engine 18A, and a resulting cooling of the reformed gas is favorable to the operation of the main engine 10. In other respects, the apparatus of FIG. 2 is identical with the apparatus of FIG. 1.

Figure 3:
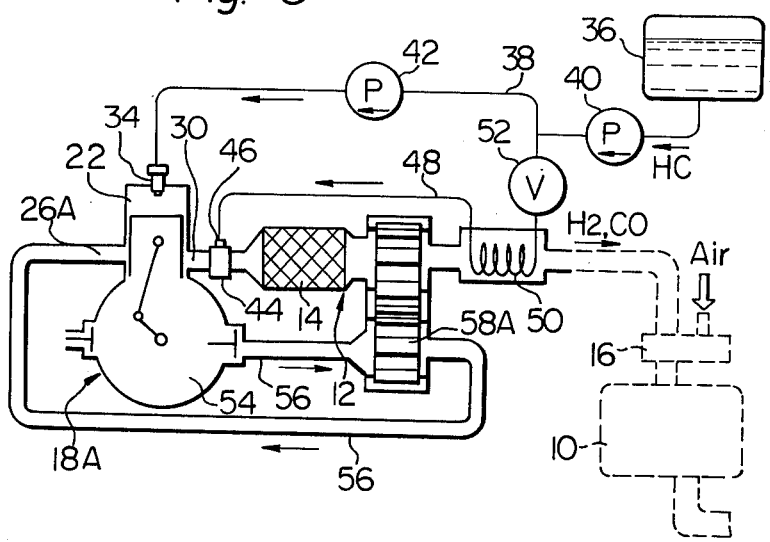

Apparatus of FIG. 3 is identical with the apparatus of FIG. 2 except that the heat exchanger 58 in FIG. 2 is replaced by a rotary regenerative heat exchanger 58A to improve an overall thermal efficiency and accomplish the heat exchange in a smaller space.

Figure 4:
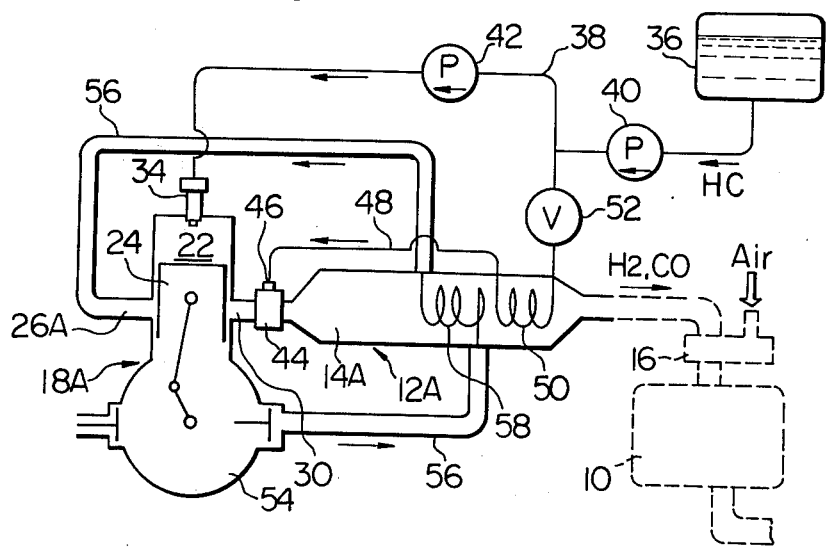

Apparatus of FIG. 4 also is similar to that apparatus of FIG. 2 except that a reformer 12A in FIG. 4 has no catalyst chamber but forms therein a combustion chamber 14A with an entrance designed as a diffuser. As is known, the hydrocarbon fuel can undergo partial oxidation reactions in the reformer or combustor 12A of this type with the advantage of no need of using a costly catalyst.

According to the invention, relatively small diesel engines which are commercially available in various types can be used as the heat and oxygen supply means in combination with a conventional reformer 12 or 12A, so that the reforming apparatus can be made simple and compact enough to be carried by and operated on automobiles. As will be understood from the foregoing description, a two-cycle compression ignition engine is preferably used as the auxiliary engine 18A according to the invention.

It will need no additional description that either a gaseous or vaporized hydrocarbon fuel also can be converted into a reformed gas of the hereinbefore described type by a method and apparatus of the invention.

What is claimed is:

1. A fuel system of an internal combustion engine, comprising:
    an auxiliary internal combustion engine of a smaller displacement than the firstly recited internal combustion engine;
    first means for supplying a hydrocarbon fuel to said auxiliary internal combustion engine at such a rate that said hydrocarbon fuel is subjected to combustion in said auxiliary internal combustion engine in the presence of excess air;
    a reformer forming therein a reaction chamber adapted to cause partial oxidation reactions of said hydrocarbon fuel to give a gaseous reformed fuel containing as combustible components essentially hydrogen and carbon monoxide;
    a first conduit connecting said auxiliary internal combustion engine to said reformer for supplying the exhaust gas of said auxiliary internal combustion engine to said reformer while said exhaust gas is at an elevated temperature;
    second means for supplying said hydrocarbon fuel to said reformer at a controlled rate such that said exhaust gas and said hydrocarbon fuel are supplied to said reaction chamber in a predetermined proportion; and
    a second conduit connecting said reformer to the firstly recited internal combustion engine for passing therethrough a gas which is discharged from said reaction chamber and includes said reformed fuel.

2. A fuel system as claimed in claim 1, wherein said predetermined proportion is such that the ratio of air contained in said exhaust gas and said hydrocarbon fuel is in the range from about 5 to about 8 by weight at the entrance to said reaction chamber.

3. A fuel system as claimed in claim 1, wherein said reaction chamber contains therein a catalyst for said partial oxidation reactions.

4. A fuel system as claimed in claim 1, wherein said reaction chamber is a combustor with a diffuser section at the entrance.

5. A fuel system as claimed in claim 1, wherein said auxiliary internal combustion engine is arranged to provide substantially no motive power to any external apparatus.

6. A fuel system as claimed in claim 1, further comprising third means for accomplishing heat exchange between said gas discharged from said reaction chamber and said hydrocarbon fuel flowing in said second means.

7. A fuel system as claimed in claim 1, wherein the displacement of said auxiliary internal combustion engine is about ¼ of the displacement of the firstly recited internal combustion engine.

8. A fuel system as claimed in claim 7, wherein said auxiliary internal combustion engine is a compression-ignition engine.

9. A fuel system as claimed in claim 8, wherein said auxiliary internal combustion engine is a two-cycle engine.

10. A fuel system as claimed in claim 9, further comprising a third conduit connecting a crankcase of said two-cycle engine to a combustion chamber of said two-cycle engine and a heat exchange means for accomplishing heat exchange between said gas discharged from said reaction chamber and air flowing in said third conduit.

11. A fuel system as claimed in claim 10, wherein said heat exchange means is a rotary regenerative heat exchanger.

12. A fuel system of an automotive internal combustion engine, comprising:

a two-cycle compression-ignition engine arranged to provide substantially no motive power to propel the automobile, the displacement of said two-cycle engine being about ¼ of the displacement of the automotive engine;

first means for supplying a hydrocarbon fuel to said two-cycle engine at such a rate that said hydrocarbon fuel is subjected to combustion in said two-cycle engine in the presence of excess air;

a reformer having therein a reaction chamber adapted to cause partial oxidation reactions of said hydrocarbon fuel to give a gaseous and heated reformed fuel containing as combustible components essentially hydrogen and carbon monoxide;

a first conduit connecting said two-cycle engine to said reaction chamber for supplying the exhaust gas of said two-cycle engine to said reaction chamber while said exhaust gas is at an elevated temperature;

second means for supplying said hydrocarbon fuel to said reformer at a controlled rate such that the ratio of air contained in said exhaust gas and said hydrocarbon fuel is in the range from about 5 to about 8 by weight at the entrance to said reaction chamber;

third means for accomplishing heat exchange between a heated gas which is discharged from said reaction chamber together with said reformed gas and said hydrocarbon fuel flowing in said second means;

a second conduit connecting said reformer to the automotive engine for passing therethrough said gas discharged from said reaction chamber;

a third conduit connecting a crankcase of said two-cycle engine to a combustion chamber of said two-cycle engine to pass therethrough air discharged from said crankcase; and fourth means for accomplishing heat exchange between said gas discharged from said reaction chamber and said air flowing through said third conduit.

* * * * *